US009829157B2

(12) United States Patent
Cocchi et al.

(10) Patent No.: US 9,829,157 B2
(45) Date of Patent: Nov. 28, 2017

(54) MACHINE FOR MAKING AND DISPENSING LIQUID AND/OR SEMI-LIQUID FOOD PRODUCTS

(71) Applicant: ALI S.p.A.—CARPIGIANI GROUP, Milan (IT)

(72) Inventors: Andrea Cocchi, Calderara di Reno (Bologna) (IT); Roberto Lazzarini, Reggio Emilia (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 0 days.

(21) Appl. No.: 14/657,661

(22) Filed: Mar. 13, 2015

(65) Prior Publication Data

US 2015/0276134 A1 Oct. 1, 2015

(30) Foreign Application Priority Data

Mar. 27, 2014 (IT) .............................. BO2014A0169

(51) Int. Cl.
*F17D 3/10* (2006.01)
*A23G 9/08* (2006.01)
(Continued)

(52) U.S. Cl.
CPC .................. *F17D 3/10* (2013.01); *A23G 9/08* (2013.01); *A23G 9/28* (2013.01); *A23G 9/305* (2013.01)

(58) Field of Classification Search
CPC ... A23G 9/08; A23G 9/28; A23G 9/30; A23G 9/305; F17D 3/10
See application file for complete search history.

(56) References Cited

U.S. PATENT DOCUMENTS

| 437,051 | A | * | 9/1890 | Slining | ..................... | F16J 15/28 |
| | | | | | | 277/543 |
| 2,464,030 | A | * | 3/1949 | Engstrom | ............ | B67D 3/0003 |
| | | | | | | 222/181.1 |

(Continued)

FOREIGN PATENT DOCUMENTS

| EP | 2067407 | 6/2009 |
| EP | 2708141 | 3/2014 |
| WO | 2007025253 | 3/2007 |

OTHER PUBLICATIONS

Italian Search Report dated Oct. 27, 2014 for counterpart application No. IT BO20140169.

*Primary Examiner* — Nicholas J Weiss
(74) *Attorney, Agent, or Firm* — Shuttleworth & Ingersoll, PLC; Timothy J. Klima

(57) ABSTRACT

A machine for making and dispensing liquid and/or semi-liquid food products includes a tank for containing the product, and a dispensing tap mounted on the discharging outlet of the tank. The tap has a duct connected to the discharging outlet and a piston sliding in a sealed fashion inside the duct. The duct has a first stretch extending between a first end and a branch of the duct from which a dispensing outlet of the tap extends, and a second stretch extending between the branch of the duct and a second end of the duct. The first end is connected in a sealed fashion to the discharging outlet and the second end is closed by a plug The piston is movable between a position preventing the dispensing of the product and allowing the washing of the duct, and a position allowing dispensing of the product.

12 Claims, 5 Drawing Sheets

(51) Int. Cl.
　　　*A23G 9/28*　　　(2006.01)
　　　*A23G 9/30*　　　(2006.01)

(56) References Cited

U.S. PATENT DOCUMENTS

| | | | |
|---|---|---|---|
| 2,803,381 A | | 8/1957 | Vouderis |
| 2,869,763 A | * | 1/1959 | Bonvini .............. A61C 9/0026 222/388 |
| 3,520,561 A | * | 7/1970 | Rininger .............. E21B 17/042 138/109 |
| 4,479,423 A | | 10/1984 | Schwitters et al. |
| 5,417,355 A | | 5/1995 | Broussalian et al. |
| 5,494,194 A | | 2/1996 | Topper et al. |
| 5,816,455 A | * | 10/1998 | Alpers ................... A23G 9/228 222/146.6 |
| 8,079,230 B2 | * | 12/2011 | Frank ...................... A23G 9/22 222/146.6 |

\* cited by examiner

MACHINE FOR MAKING AND DISPENSING LIQUID AND/OR SEMI-LIQUID FOOD PRODUCTS

BACKGROUND OF THE INVENTION

This application claims priority to Italian Patent Application No. BO2014A000169 filed Mar. 27, 2014, which application is incorporated by reference herein.

This invention relates to a machine for making and dispensing liquid and/or semi-liquid food products More specifically, this invention relates to machines for making and dispensing food products which require a thermal treatment in their production cycle, such as, for example, ice creams, whipped cream, creams, chocolate, yogurt and the like.

Machines of this kind are the so-called "pasteurizers", capable of mixing, cooking, pasteurizing, homogenizing, cooling, aging and storing under perfect conditions of hygiene, diverse specialty foods of the patisserie, ice cream and gourmet sectors.

Without limiting the scope of the invention, the following description will make specific reference to the above-mentioned pasteurizers.

Generally speaking, the pasteurizers comprise a tank for containing the product to be processed, at least one dispenser tap mounted at the bottom of the front of the tank and a stirrer mounted inside the tank for mixing the product.

According to known methods, the thermal treatment is generally performed by means of electrical resistors and/or a heating system based on a thermodynamic cycle.

The processing the product is therefore both of a mechanical type, by using the stirrer, and of a thermal type, using a heating unit and/or cooling unit.

The pasteurizers require frequent cleaning and sanitizing operations to prevent a proliferation of the bacterial charge, especially inside the tap where there can easily stagnate product residue.

Normally, the cleaning operations comprise the complete removal of the tap and its careful washing. However, this operation comprises a preliminary emptying of the tank, without which the removal of the tap would inevitably lead to an escape of product outside the tank.

SUMMARY OF THE INVENTION

The aim of this invention is to overcome the above-mentioned drawback. More specifically, the aim of this invention is to provide a machine for making and dispensing liquid and/or semi-liquid food products wherein the tap is more easily sanitized than that of the prior art.

This aim is fully achieved by the machine according to the present description.

BRIEF DESCRIPTION OF THE DRAWINGS

The technical features and advantages of the invention are more apparent in the following description of a preferred but non-limiting embodiment of it. The description refers to the accompanying drawings, which are also provided purely by way of non-limiting example and in which.

Figure 1:
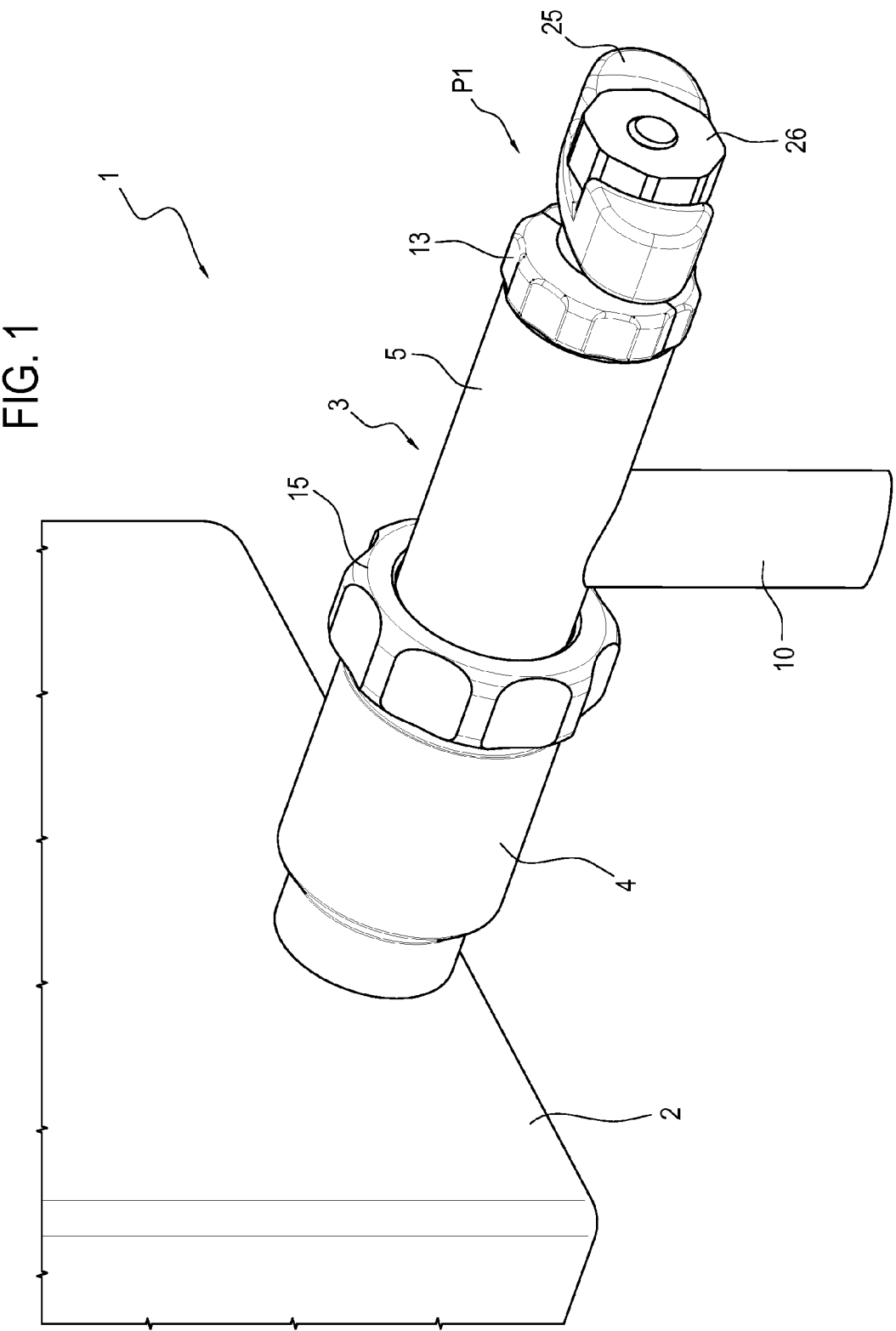
FIG. 1 shows, with some parts cut away for clarity, a preferred embodiment of the machine according to the invention.
Figure 2:
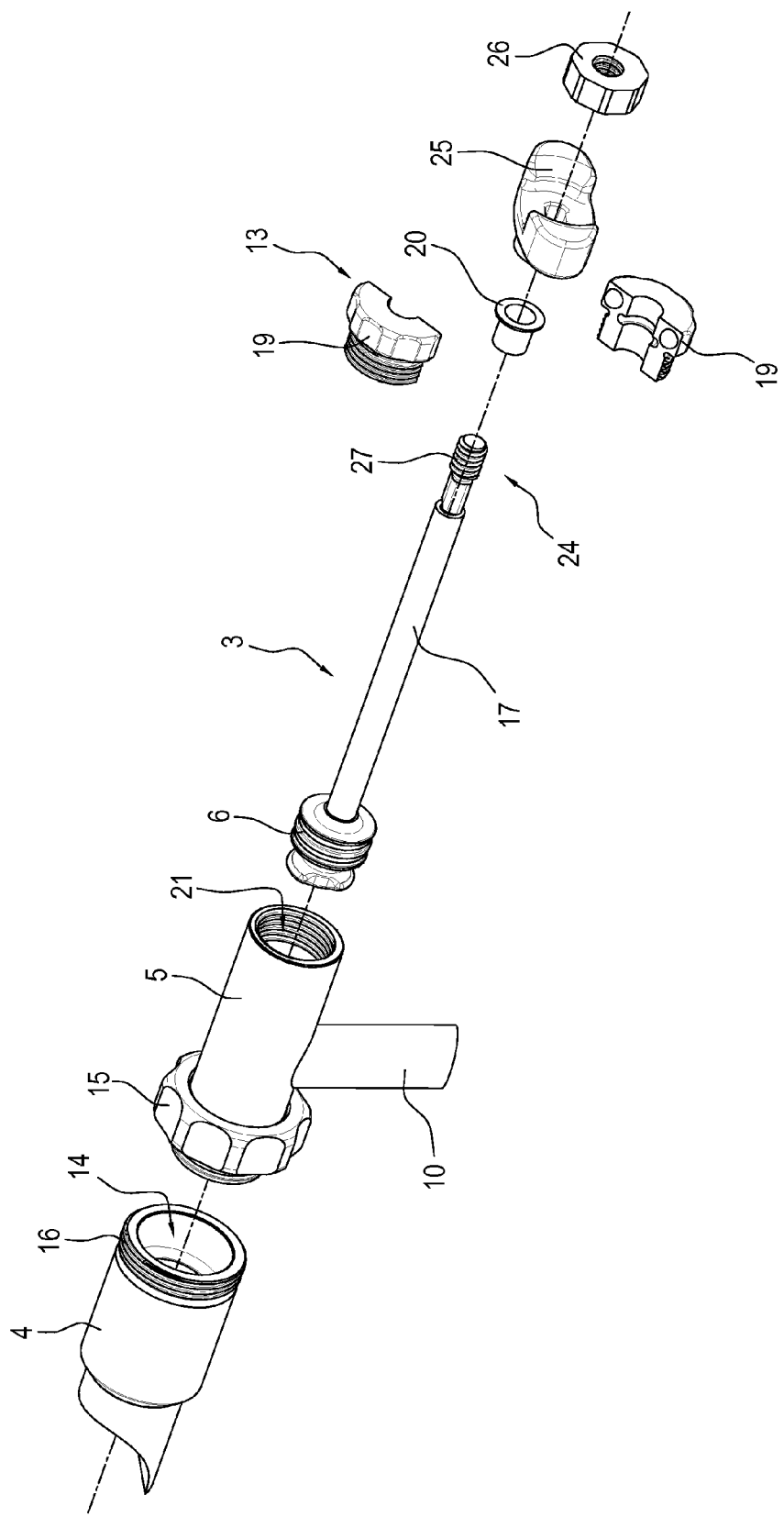
FIG. 2 shows an exploded view of a detail of the machine of FIG. 1.
Figure 3:
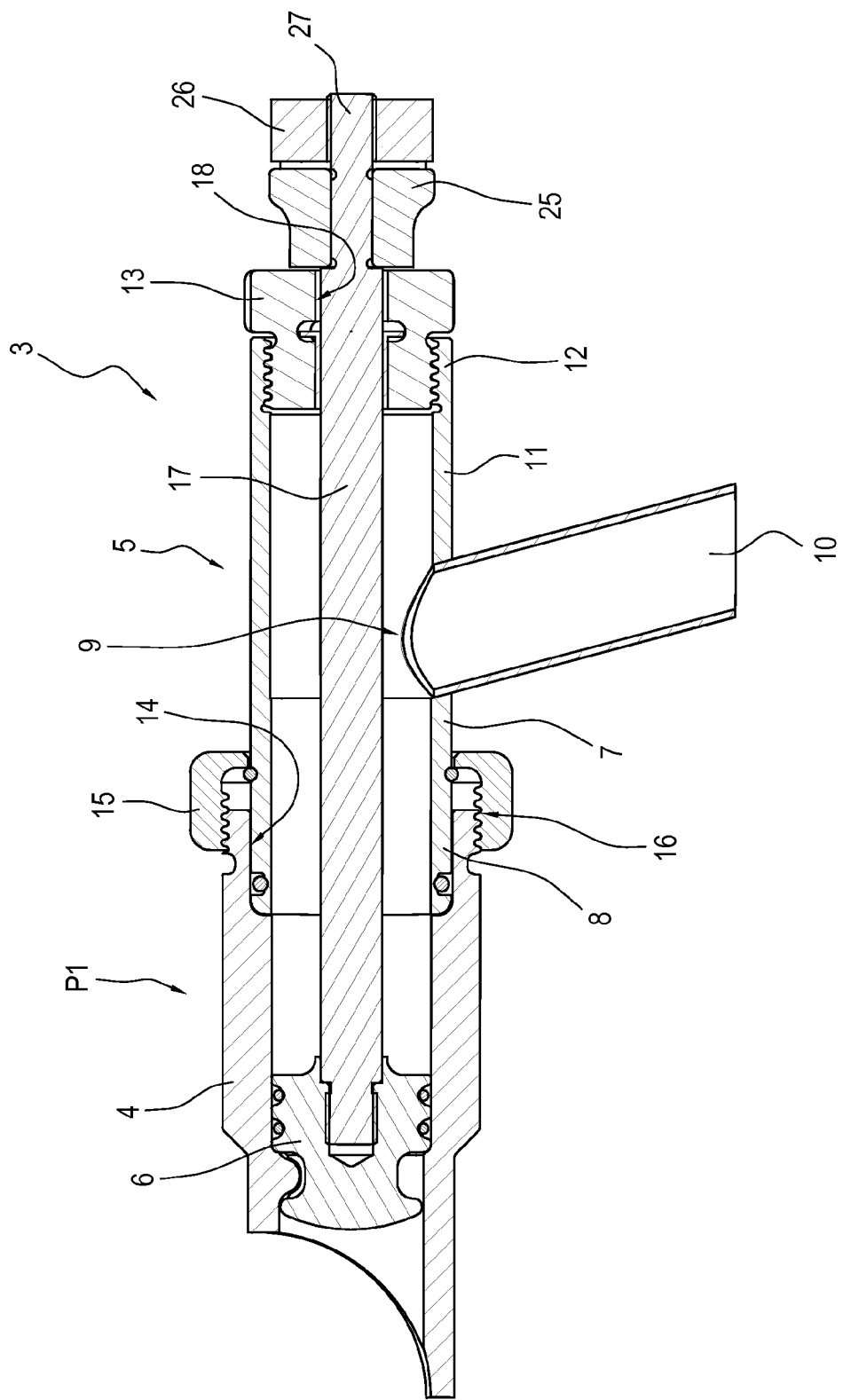
FIGS. 3, 4 and 5 show cross sections of the detail of FIG. 2 in three respective operating configurations.
Figure 4:
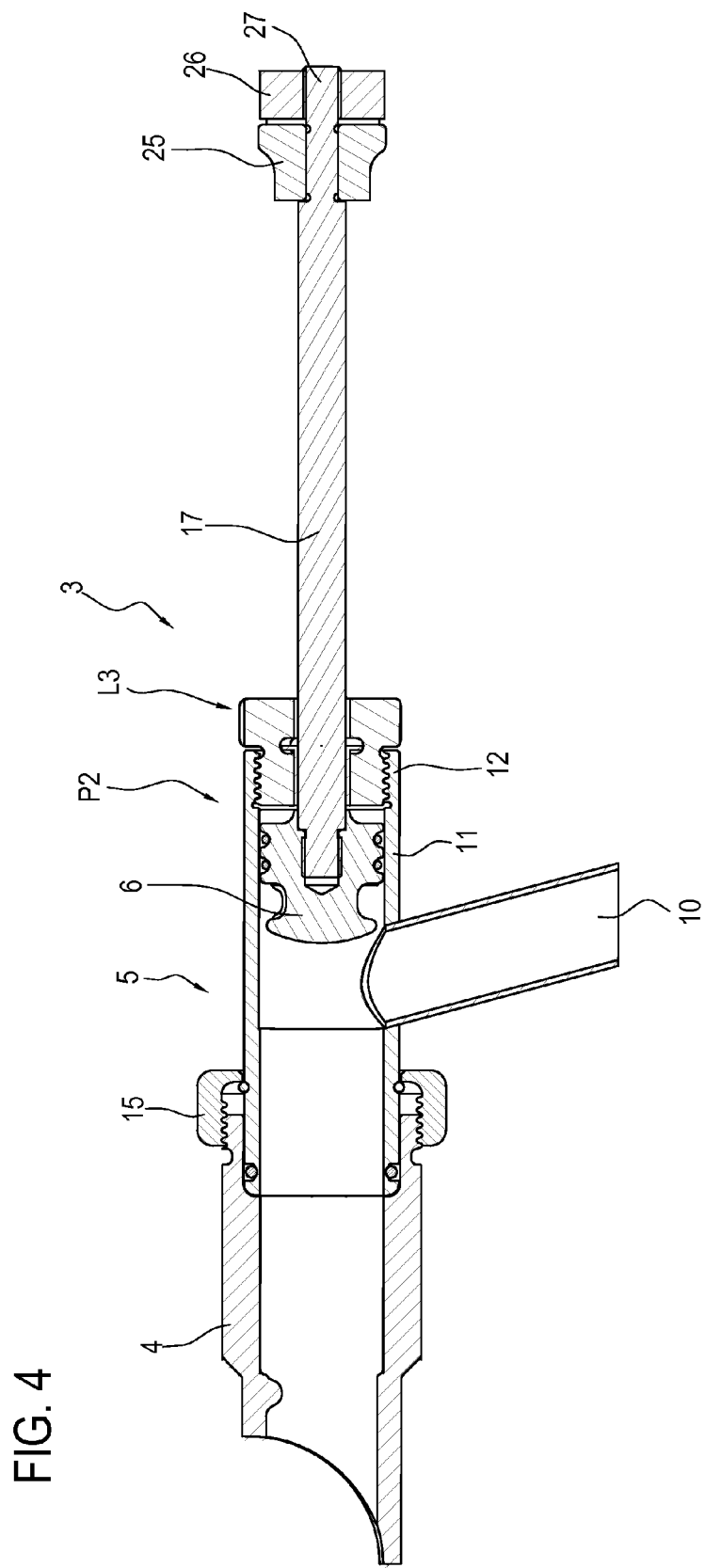
Figure 5:
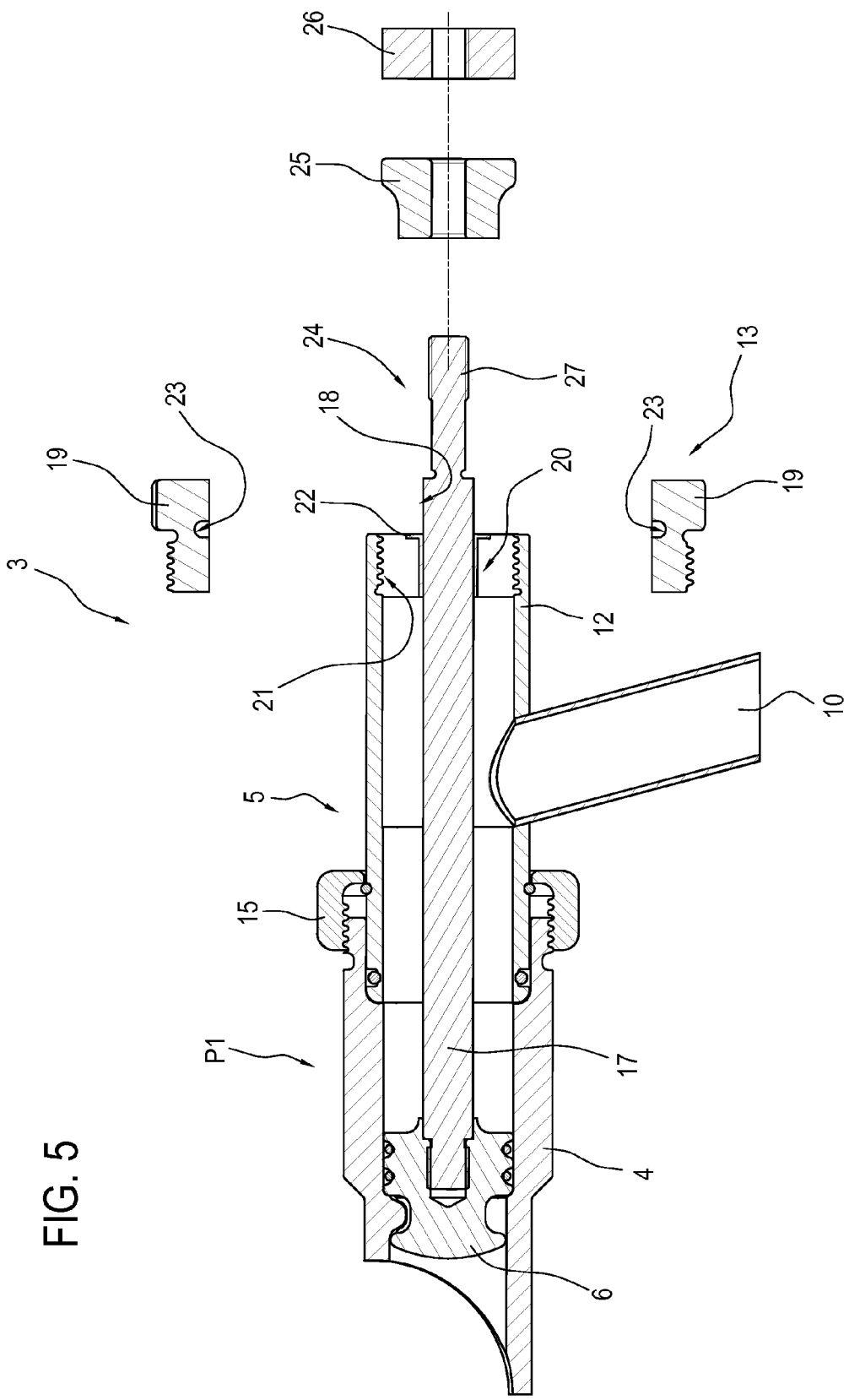

DESCRIPTION OF THE PREFERRED EMBODIMENTS in FIG. 1, the reference numeral 1 denotes in its entirety a machine for making and dispensing liquid and/or semi-liquid food products.

More specifically, the machine 1 is a so-called "pasteurizer". For example, the above-mentioned food products may be ice creams, whipped cream, creams, chocolate, yogurt or other similar products.

The machine 1 comprises a frame (not illustrated) on which is mounted at least one tank 2 for containing the product to be processed and dispensed.

The machine 1 also comprises at least one dispensing tap 3, which is mounted on a respective discharging outlet 4 of the tank 2.

The outlet 4 is positioned on the bottom of the tank 2.

The tank 2 of the machine 1 is also equipped, in known manner not illustrated in detail here, with at least one power-driven stirrer mounted inside it to mix the product contained in the tank 2.

The machine 1 also comprises thermal treatment means operatively act on the product contained in the tank 2.

As shown in more detail in FIGS. 2 to 5, the tap 3 comprises a duct 5 connected to the discharging outlet 4 and a piston 6 slidable in a sealed fashion inside the duct 5.

The duct 5 comprises a first stretch 7, which extends between a first longitudinal end 8 of the duct 5 and a branch 9 of the duct 5 from which a dispensing opening 10 of the tap 3 extends.

The duct 5 also comprises a second stretch 11, which extends between the branch 9 of the duct 5 and a second longitudinal end 12 of the duct 5.

The two stretches 7 and 11 follow one another continuously and completely define the entire duct 5.

In other words, the two stretches 7 and 11 define two consecutive branches aligned with each other of a T-shaped branch of which the opening 10 defines the third branch transversal to the first two.

The first longitudinal end 8 is connected in a sealed fashion to the discharging outlet 4 of the tank 2 and the second longitudinal end 12 is closed by a plug 13.

The piston 6 is movable between a first end of stroke position P1 (FIGS. 1, 3 and 5), in which the piston 6 is contained in a sealed fashion in the discharging outlet 4 of the tank 3, preventing dispensing of the product and, as described below, allows washing of the duct 5, and a second end of stroke position P2 (FIG. 4), in which the piston 6 is contained in a sealed fashion in the second stretch 11 of the duct 5 and allows dispensing of the product.

The first longitudinal end 8 of the duct 5 and the discharging outlet 4 of the tank 2 have the same internal diameter and are joined to one another with a uniform uninterrupted inner surface. More specifically, the first longitudinal end 8 of the duct 5 is engaged axially in an end cylindrical seat 14 of the discharging outlet 4 and is tightened in the position of engagement by means of a ring nut 15, which is screwed onto a thread 16 outside of the discharging outlet 4.

The above-mentioned uninterrupted inner surface in the joining zone between the first longitudinal end 8 of the duct 5 and the discharging outlet 4 of the tank 2 is very important in order to guarantee a smooth sliding of the piston 6 through the joining zone.

The piston 6 is operated by a rod 17, which is movable coaxially along the duct 5 and exits from the second longitudinal end 12 of the duct 5 through a central opening 18 of the plug 13, to which the rod 17 is slidably coupled.

The plug 13 can be opened, that is to say, can be removed, in particular unscrewed, from the second longitudinal end 12.

It should be noted that, preferably, the plug 13 is composed of at least two elements 19, which can be coupled and uncoupled to and from one another.

It should be noted that, preferably, the two elements are two half-shells.

In the embodiment illustrated, the plug 13 is formed by three elements which are assembled together and easily disassembled from each other. More specifically, the plug 13 is formed by two externally threaded half-shells 19 and by a bushing 20 enclosed between the half-shells 19.

The half-shells 19, which are drawn near each other, are screwed on a thread 21 inside the longitudinal second end 12 of the duct 5, and each define a corresponding half the above-mentioned opening 18.

The purpose of the bushing 20, in use (that is to say, when the plug 13 is mounted), is to slidably guide the rod 17, keeping the rod 17 perfectly coaxial with the duct 5 in its passage between the above-mentioned end of stroke positions P1 and P2.

The bushing 20 has an annular flange 22 housed, for one half, in a peripheral inner seat 23 of a half-shell 19 and, for the remaining half, in a peripheral inner seat 23 of the other half-shell 19. In that way, the bushing 20 remains securely enclosed between the half-shells 19 during the sliding of the rod 17.

The rod 17 comes out of the central opening 18 of the plug 13 with a relative end stretch 24, on which is fitted a knob 25, in turn clamped axially on the rod 17 by means of a handle 26 screwed on the threaded end 27 of the rod 17.

The operation of the tap 3 during the passage from its closed configuration to the open configuration, and vice versa, is immediately inferable from the above description and does not therefore need further explanation.

More specifically, the longitudinal movement of the rod between the end of stroke positions described above is such that the tap is respectively closed or open (configuration wherein the product is released through the outlet 10).

Described in detail below, on the other hand, are two particular cleaning operations, both allowed from the tap 3, so that, advantageously, a preliminary emptying of the tank 2 is not necessary.

For this reason, it should be noted that, advantageously, the tap according to the invention makes it possible to overcome the problems highlighted above with reference to the taps of known type.

According to a first cleaning operation, after moving the piston 6 to the first end of stroke position P1 (FIGS. 1, 3 and 5), in which, as mentioned, the piston 6 is contained in a sealed fashion inside the discharging outlet 4 of the tank 3 and prevents the dispensing of the product, it is merely necessary, in sequence, to unscrew the handle 26, remove the knob 25 from the rod 17 and unscrew the plug 13, thus opening in this way the second longitudinal end 12 of the duct 5. At this point, the sanitizing of the duct 5 may be performed by a washing fluid flowing through the end 12 and the dispensing outlet 10 of the tap 3.

It should be noted that, preferably, the washing fluid is made to recirculate inside the tap through the dispensing opening 10 and it escapes through the end 12 which is no longer closed by the plug 13.

In this way, it is possible to sanitize, advantageously, the internal region of the tap in a particularly fast, simple and effective manner.

According to an alternative cleaning operation, after moving the piston 6 to the first end of stroke position P1 (FIGS. 1, 3 and 5), in which, as mentioned, the piston 6 is contained in a sealed fashion inside the discharging outlet 4 of the tank 3 and prevents the dispensing of the product, it is merely necessary, to unscrew the ring nut 15 and remove the duct 5 from the discharging outlet 4 of the tank 2 (preferably after removing the plug 13 and the knob 26).

This operation, which allows a separate cleaning of the duct 5, is allowed by the fact that, advantageously, the duct 5 and the piston 6 are uncouplable from the discharging outlet 4 of the tank 2 independently from each other.

Also defined is a method for cleaning the tap 3 of a machine 1 as described above, comprising the following steps:

uncoupling the plug (13) from the duct (5) thereby opening the second longitudinal end (12) of the duct (5);

holding the piston (6) in the first end of stroke position (P1), in which the piston (6) is contained in a sealed fashion in the discharging outlet (4) of the tank (2);

making a washing fluid enter one among the dispensing outlet (10) and the second longitudinal end (12) and making the washing liquid exit through the other among said dispensing outlet (10) and second longitudinal end (12), for allowing cleaning of an inner region of said duct (5).

The invention described has evident industrial applications and can be modified and adapted in several ways without thereby departing from the scope of the inventive concept. Moreover, all the details of the invention may be substituted for technically equivalent elements.

What is claimed is:

1. A machine for making and dispensing liquid or semi-liquid food product, comprising:

a containment tank for a food product to be processed and dispensed, the containment tank comprising a discharging outlet for discharging the food product to be dispensed;

a dispensing tap mounted on the discharging outlet of the containment tank, the dispensing tap comprising a duct connected to the discharging outlet and a piston slidable in a sealed manner inside the duct;

wherein the duct comprises a first stretch, extending between a first longitudinal end of the duct and a branch of the duct from which extends a dispensing outlet of the tap, and a second stretch, extending between the branch of the duct and a second longitudinal end of the duct; the first longitudinal end being connected in a sealed manner to the discharging outlet of the containment tank;

a plug closing the second longitudinal end;

wherein the piston is movable between a first position, in which the piston is contained in a sealed manner in the discharging outlet of the containment tank to prevent dispensing of the food product and allow washing of the duct, and a second position, in which the piston is contained in a sealed manner in the second stretch of the duct and allows dispensing of the food product;

wherein the plug is removable from the duct when the piston is in the first position;

wherein the second longitudinal end includes an internal thread and the plug includes two half-shells which are coupled to one another when the plug is positioned in the duct and which can be separated from one another when the plug is removed from the duct, with each of the two half-shells including an outer thread for engaging the internal thread of the second longitudinal end;
wherein the discharging outlet includes a thread and an end cylindrical seat;
wherein the first longitudinal end of the duct is engaged axially in the end cylindrical seat to provide a uniform uninterrupted inner surface between the duct and the discharging outlet;
a ring nut engaging the thread of the discharging outlet to tighten the first longitudinal end of the duct in engagement with the end cylindrical seat.

2. The machine according to claim 1, wherein the first longitudinal end of the duct and the discharging outlet of the containment tank have a same internal diameter and are joined to one another with a uniform uninterrupted inner surface.

3. The machine according to claim 1, and further comprising a rod connected to the piston for operating the piston, the rod being movable coaxially along the duct and exiting the second longitudinal end of the duct through a central opening of the plug, the rod being slidably coupled to the central opening of the plug.

4. The machine according to claim 1, wherein the duct is removably couplable to the discharging outlet of the containment tank.

5. The machine according to claim 1, wherein the duct and the piston are uncouplable from the discharging outlet of the containment tank independently of one another.

6. A method for cleaning the tap of a machine for making and dispensing liquid or semi-liquid food product, comprising:
providing a containment tank for a food product to be processed and dispensed, the containment tank comprising a discharging outlet for discharging the food product to be dispensed;
providing a dispensing tap mounted on the discharging outlet of the containment tank, the dispensing tap comprising a duct connected to the discharging outlet and a piston slidable in a sealed manner inside the duct;
providing that the duct comprises a first stretch, extending between a first longitudinal end of the duct and a branch of the duct from which extends a dispensing outlet of the tap, and a second stretch, extending between the branch of the duct and a second longitudinal end of the duct; the first longitudinal end being connected in a sealed manner to the discharging outlet of the containment tank;
providing a plug closing the second longitudinal end;
providing that the piston is movable between a first position, in which the piston is contained in a sealed manner in the discharging outlet of the containment tank to prevent dispensing of the food product and allow washing of the duct, and a second position, in which the piston is contained in a sealed manner in the second stretch of the duct and allows dispensing of the food product;
providing that the plug is removable from the duct when the piston is in the first position;
providing that the second longitudinal end includes an internal thread and the plug includes two half-shells which are coupled to one another when the plug is positioned in the duct and which can be separated from one another when the plug is removed from the duct, with each of the two half-shells including an outer thread for engaging the internal thread of the second longitudinal end;
uncoupling the plug from the duct by unscrewing the two half-shells from the internal thread of the second longitudinal end and separating the two half-shells away from the duct, thereby opening the second longitudinal end of the duct;
holding the piston in the first end of stroke position, in which the piston is contained in a sealed fashion in the discharging outlet of the containment tank;
making a washing fluid enter at least one chosen from the dispensing outlet and the second longitudinal end and making the washing liquid exit through the other of the dispensing outlet and second longitudinal end, for allowing cleaning of an inner region of said duct;
providing that the discharging outlet includes a thread and an end cylindrical seat;
engaging the first longitudinal end of the duct axially in the end cylindrical seat to provide a uniform uninterrupted inner surface between the duct and the discharging outlet;
engaging the thread of the discharging outlet with a ring nut to tighten the first longitudinal end of the duct in engagement with the end cylindrical seat.

7. The machine according to claim 2, and further comprising a rod connected to the piston for operating the piston, the rod being movable coaxially along the duct and exiting the second longitudinal end of the duct through a central opening of the plug, the rod being slidably coupled to the central opening of the plug.

8. The machine according to claim 7, wherein the duct is removably couplable to the discharging outlet of the containment tank.

9. The machine according to claim 8, wherein the duct and the piston are uncouplable from the discharging outlet of the containment tank independently of one another.

10. The machine according to claim 3, wherein the duct is removably couplable to the discharging outlet of the containment tank.

11. The machine according to claim 10, wherein the duct and the piston are uncouplable from the discharging outlet of the containment tank independently of one another.

12. The machine according to claim 3, wherein the duct and the piston are uncouplable from the discharging outlet of the containment tank independently of one another.

* * * * *